United States Patent [19]

Lindstrom

[11] 4,245,668

[45] Jan. 20, 1981

[54] PRESSURE REGULATOR

[75] Inventor: Bengt A. Lindstrom, Vancouver, Canada

[73] Assignee: Chemetics International Ltd., Vancouver, Canada

[21] Appl. No.: 7,970

[22] Filed: Jan. 31, 1979

[30] Foreign Application Priority Data

Feb. 28, 1978 [CA] Canada ................................. 297859

[51] Int. Cl.³ ............................................. F16K 15/06
[52] U.S. Cl. .................................... 137/534; 137/526; 137/528; 137/584
[58] Field of Search ................ 137/526, 528, 529, 532, 137/534

[56] References Cited

U.S. PATENT DOCUMENTS

| | | | |
|---|---|---|---|
| 754,468 | 3/1904 | Lombard | 137/529 X |
| 3,714,953 | 2/1973 | Solvang | 137/528 |

FOREIGN PATENT DOCUMENTS 638352  6/1950  United Kingdom ..................... 137/528

Primary Examiner—Robert G. Nilson
Attorney, Agent, or Firm—Guy Drouin

[57] ABSTRACT

A pressure or vacuum relieving device intended as a large capacity inbreathing or outbreathing apparatus for equipment and/or piping, operating under low to moderate gas pressure or vacuum, e.g. 1 to 15 psig pressure or 0-5 psi vacuum. The principal feature is that a required set pressure is provided hydrostatically by means of a liquid leg acting an a bellows expansion joint. The device is suitable for use in Pulp Mill Digester Blow Steam Systems and similar applications.

7 Claims, 1 Drawing Figure

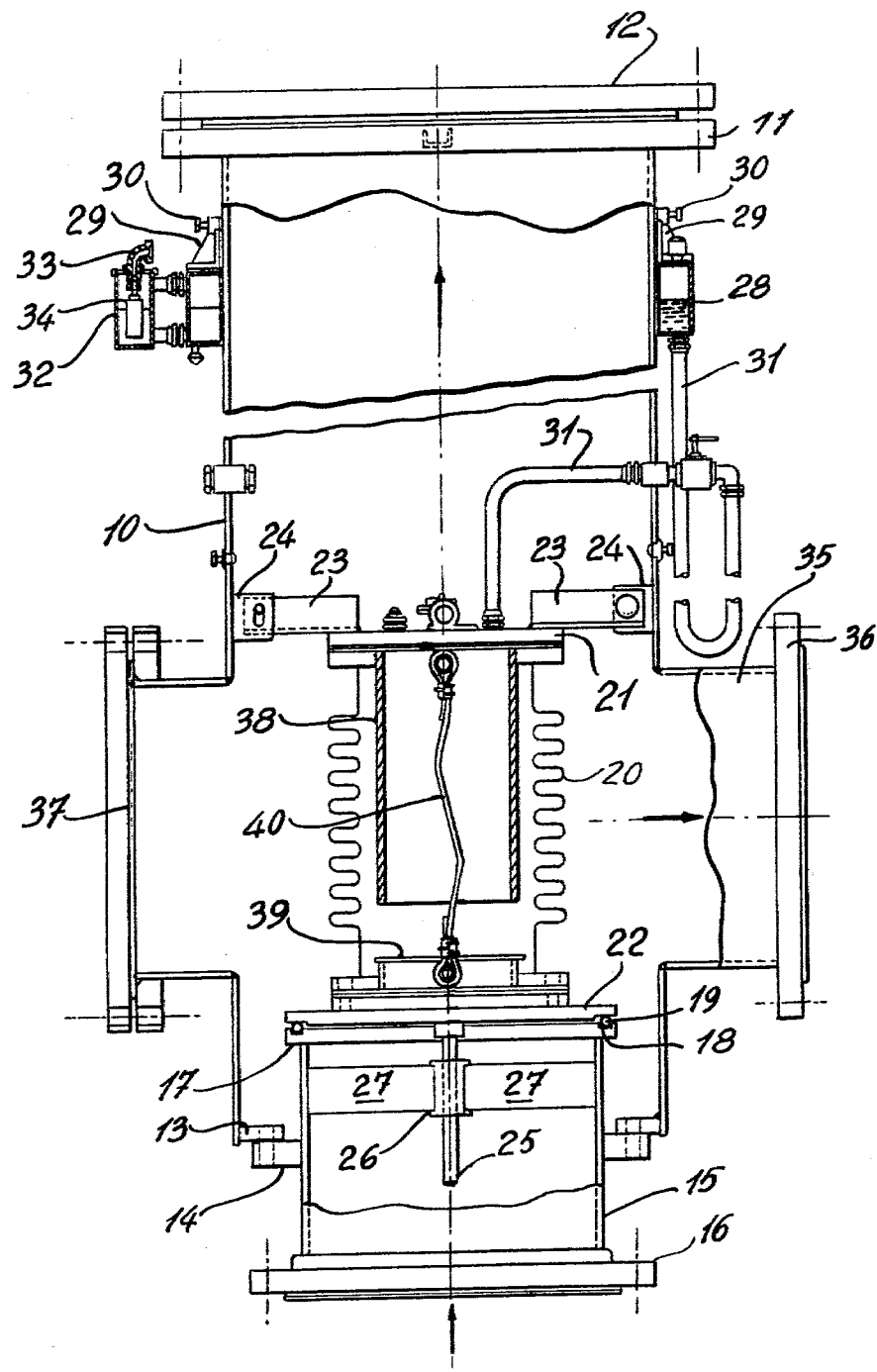

PRESSURE REGULATOR

This invention relates to a device for controlling the pressure in systems operating under low to moderate gas pressure or vacuum.

The main object of the invention is to provide a pressure regulator which shall be reliable in operation, durable and simple in construction. This and other objects will appear hereinafter.

The proposed device is intended as a large capacity in-breathing or outbreathing apparatus for systems such as equipment or piping, operating under low to moderate gas pressure or vacuum, e.g. 1 to 15 psig pressure or 0 to 5 psi vacuum. The principal feature of the novel device is that a required set pressure is provided hydrostatically by means of a liquid leg acting on a bellows expansion joint. The device is suitable for use is Pulp Mill Digester Blow Steam Systems and similar applications.

Thus, the pressure regulator according to the invention comprises:

(a) an elongated vertically disposed housing having a closed top and an open bottom, (b) an inlet conduit projecting axially into the housing through the bottom thereof, (c) means connecting and sealing the space between the inlet conduit and the housing at or near the bottom end of the latter, (d) an outlet conduit, (e) a bellows expansion joint hermetically closed at both ends and vertically disposed in the housing, the upper end thereof being fixed to the inside of the housing and the lower end compressively resting on the top end of the inlet conduit, (f) sealing means between the lower end of the bellows expansion joint and the top end of the inlet conduit, (g) an enclosed head tank mounted outside the housing and above the bellows, (h) a conduit connecting the bottom of the head tank to the top of the bellows, (i) a hydraulic fluid filling the bellows, conduit and part of the head tank, (j) a conduit connecting the unfilled part of the head tank to atmosphere, and (k) means for closing the latter conduit upon a rise of the level of the hydraulic fluid in the head tank.

The invention will now be described by reference to the accompanying drawing in which the single FIGURE is a side elevation of an embodiment of the invention, parts being shown in section and parts being broken away.

Referring to the drawing, reference numeral 10 indicates a vertically disposed tubular shell or housing having a flanged top end 11 adapted to receive a closing lid 12. Projecting through the bottom end of housing 10 and fixed to the inside wall thereof by means of cooperating annular flanges 13 and 14 and bolts (not shown), is an inlet conduit 15. The cooperation between flanges 13 and 14 is such that the space between housing 10 and inlet conduit 15 is fluid tightly sealed. At its lower end, inlet conduit 15 is suitably equipped with an annular flange 16 for easy connection to a system operating under pressure, whereas at its upper end it terminates into another flange 17 the top face of which has an annular recess 18 adapted to receive a resilient sealing O-ring 19.

Disposed immediately above the upper end of inlet conduit 15 and axially thereof is a bellows expansion joint 20 of rubber or steel construction and hermetically closed at its ends by a top plate 21 and a bottom plate 22. The top plate is fixed to housing 10 by means of a set of cooperating brackets 23 and lugs 24. The bottom plate 22 rests on O-ring 19 and provides a gas tight seal between the interior of housing 10 and inlet conduit 15. In order to guide it in its vertical movement as will appear hereinafter, bottom plate 22 is suitably provided with a downwardly extending shaft 25 adapted to slide in sleeve 26 attached to the interior wall of conduit 15 by means of brackets 27.

Mounted above the top end of bellows 20 and outside of housing 10 is an enclosed head tank 28 which in this particular embodiment of the invention is an annular reservoir around the whole circumference of the housing. It should be understood, however, that the head tank can be of any suitable structure or shape and can be mounted remote from housing 10. The head tank 28 is slidable vertically along the wall of the housing and is provided with brackets 29 and suitable screws 30 whereby it can be fixed to the wall of the housing at the desired height. Bellows expansion joint 20 is connected to the bottom of head tank 28 by means of standpipe 31. Filling the bellows, standpipe and only part of the head tank is a liquid, preferably non-volatile such as ethylene glycol. The latter is mentioned only as an example and it should be clear to those versed in the art that other liquids can be used. The head tank 28 is equipped with a valve system 32 comprised of a vent 33 and a float 34 adapted to close the latter in response to a rise of the liquid level in the head tank.

Projecting from the side wall of housing 10, there is shown an outlet conduit 35 suitably having a flange 36 for easy connection to a system operating under vacuum. This outlet conduit 35, although shown in the figure as being in the region of the bellows 20, can, however, be located at any suitable place around the wall of housing 10 or at the top thereof.

Also shown in the figure is a non essential but useful inspection and manhole 37 of known construction. Inside bellows expansion joint, there may be provided means as shown including a tube 38 and raised plate 39 cooperating to prevent overcompression of the bellows, and a cable 40 linking top and bottom plates 21 and 22 to prevent overstretching of the bellows when the latter is loosened from housing 10 and lifted out of its place.

As indicated hereinabove, the device of the invention may be used for pressure relief or vacuum relief. When it is used to control the pressure of a system operating under a set pressure, the device is connected to the system by means of inlet conduit 15 and flange 16. The position of head tank 28 is then adjusted so that the level of liquid therein is at such a vertical distance above the bottom of expansion joint 20 that it provides a hydrostatic pressure which, added to any participating weight and spring force of said joint, including attachments, equals the forces of said set pressure acting over the cross sectional area of inlet conduit 15. When the set pressure is reached in the system under control, the expansion joint bottom plate 22 lifts and bellows 20 starts to compress, displacing the liquid into the head tank 28. As the liquid level rises in head tank 28, the air in the unfilled part of the tank is vented out through float controlled valve system 32. At a predetermined maximum liquid level, the float valve 34 closes air vent 33 so that further movement of expansion joint 20 results in compression of remaining air in heat tank 28. The compressed air cushion serves two purposes. It limits the compression of the expansion joint as well as provides an inertia at beginning of expansion joint return stroke at closure. The gas entering into housing 10 upon pressure relief of the system under control is vented out through outlet conduit 35 which in this particular embodiment of the invention is preferably located at the top of said housing 10. It will readily be understood by those skilled in the art that outlet conduit 35 could be provided by simply omitting the lid 12 of housing 10.

When used to control the pressure in a system operating under a set vacuum, the device is connected to the system by means of outlet conduit 35 and flange 36. The position of head tank 28 is adjusted in the same manner as explained above so that the total pressure exerted on plate 22 counterbalance the set vacuum in the system under control. When said set vacuum is exceeded, plate 22 is lifted by suction and air or any other desired gas is admitted into the system under control through inlet conduit 15. Valve system 32 operates exactly in the same way as above described for pressure relief. In this other embodiment of the invention, outlet conduit 35 is preferably located on the vertical wall of housing 10 but it should be understood that it could also be at the top of said housing.

What we claim is:
1. A pressure regulator comprising:
   (a) an elongated vertically disclosed housing having, a closed top and an open bottom;
   (b) an inlet conduit projecting axially into the housing through the bottom end thereof;
   (c) means connecting, and sealing the space between, the inlet conduit and the housing at or near the bottom end of the latter;
   (d) an outlet conduit;
   (e) a bellows expansion joint hermetically closed at both ends and vertically disposed into the housing, the upper end thereof being fixed to the inside of the housing and the lower end compressively resting on the top end of the inlet conduit;
   (f) sealing means between the lower end of the bellows expansion joint and the top end of the inlet conduit;
   (g) an enclosed head tank mounted outside the housing and above the bellows expansion joint;
   (h) a conduit connecting the bottom of the head tank to the top of the bellows expansion joint;
   (i) a hydraulic fluid filling the bellows, conduit (h) and part of the head tank;
   (j) a conduit connecting the unfilled part of the head tank to atmosphere, and
   (k) means closing the latter conduit upon a rise of the hydraulic fluid level in the head tank.

2. A pressure regulator as claimed in claim 1 wherein the outlet conduit (d) is located at the top of the housing (a).

3. A pressure regulator as claimed in claim 1 wherein the outlet conduit (d) is located on vertical wall of the housing (a).

4. A pressure regulator as claimed in claim 1, 2 or 3 wherein the head tank (g) is adjustable regarding vertical distance above the bellows expansion joint.

5. A pressure regulator as claimed in claim 1, 2 or 3 wherein the housing is cylindrical, and the head tank is annular and extends circumferentially around the housing and is slidably adjustable as to vertical distance above the bellows expansion joint.

6. A pressure regulator as claimed in claim 1, 2 or 3 wherein the sealing means is a resilient O-ring.

7. A pressure regulator as claimed in claim 1, 2 or 3 wherein the lower end of the bellows expansion joint includes a means for guiding its vertical movement.

* * * * *